US012583673B2

(12) United States Patent
Austrheim et al.

(10) Patent No.: US 12,583,673 B2
(45) Date of Patent: Mar. 24, 2026

(54) ACCESS STATION FOR AN AUTOMATED STORAGE AND RETRIEVAL SYSTEM AND METHOD FOR USING SAME

(71) Applicant: Autostore Technology AS, Nedre Vats (NO)

(72) Inventors: Trond Austrheim, Etne (NO); Ivar Fjeldheim, Haugesund (NO); Magne Hatteland, Stavanger (NO); Simen Aarseth, Stavanger (NO)

(73) Assignee: AutoStore Technology AS, Nedre Vats (NO)

( * ) Notice: Subject to any disclaimer, the term of this patent is extended or adjusted under 35 U.S.C. 154(b) by 344 days.

(21) Appl. No.: 18/037,678

(22) PCT Filed: Dec. 20, 2021

(86) PCT No.: PCT/EP2021/086850
§ 371 (c)(1),
(2) Date: May 18, 2023

(87) PCT Pub. No.: WO2022/136299
PCT Pub. Date: Jun. 30, 2022

(65) Prior Publication Data
US 2023/0406630 A1 Dec. 21, 2023

(30) Foreign Application Priority Data
Dec. 23, 2020 (NO) .................................... 20201433

(51) Int. Cl.
*B65G 1/04* (2006.01)
(52) U.S. Cl.
CPC .... *B65G 1/0464* (2013.01); *B65G 2201/0235* (2013.01)
(58) Field of Classification Search
None
See application file for complete search history.

(56) References Cited

U.S. PATENT DOCUMENTS 5,957,558 A 9/1999 Quade
8,851,819 B2 * 10/2014 Kamikawa ........ H01L 21/67727
414/940

(Continued)

FOREIGN PATENT DOCUMENTS

CN 104495181 A 4/2015
DE 4412634 A1 10/1995

(Continued)

OTHER PUBLICATIONS

Machine translation of EP3520957 from espacenet. (Year: 2019).*

(Continued)

*Primary Examiner* — Mark C Hageman
(74) *Attorney, Agent, or Firm* — Baker Botts L.L.P.

(57) ABSTRACT

An access station, which is for presentation of a storage container from an automated storage and retrieval system to a picker, includes an access module, a drawer, a first actuator, and a second actuator. The access module includes a frame defining a drawer compartment provided within the frame. The drawer includes a drawer base and a drawer front. The drawer is movably connected to the frame. The first actuator is for moving the drawer relative to the frame between a presentation position in which the drawer is protruding from the drawer compartment and a retracted position in which the drawer is retracted within the drawer compartment. The drawer base includes a support on which the storage container can be supported in a front position or in a rear position. The second actuator is for moving the storage container from the front position to the rear position. The storage container is presented to the picker when the storage container is in the front position and when the drawer is in the presentation position.

19 Claims, 14 Drawing Sheets

(56)                References Cited

U.S. PATENT DOCUMENTS

| | | | | |
|---|---|---|---|---|
| 10,259,014 | B2 | 4/2019 | Rieu | |
| 10,730,078 | B2* | 8/2020 | Wagner | B65G 1/1378 |
| 11,427,409 | B2* | 8/2022 | Chintalapalli Patta | |
| | | | | B65G 1/0464 |
| 2004/0101386 | A1 | 5/2004 | Robey | |
| 2010/0176699 | A1 | 7/2010 | Biba et al. | |
| 2022/0194705 | A1* | 6/2022 | Hatteland | B65G 1/0485 |
| 2023/0406637 | A1* | 12/2023 | Chatain | B65G 1/0485 |

FOREIGN PATENT DOCUMENTS

| | | | |
|---|---|---|---|
| EP | 3520957 | A1 | 8/2019 |
| GB | 1449266 | A | 9/1976 |
| NO | 317366 | B1 | 10/2004 |
| WO | 2014/075937 | A1 | 5/2014 |
| WO | 2014/090684 | A1 | 6/2014 |
| WO | 2015/193278 | A1 | 12/2015 |
| WO | 2017/121515 | A1 | 7/2017 |
| WO | 2017/211596 | A1 | 12/2017 |
| WO | 2017/211640 | A1 | 12/2017 |
| WO | 2018/146304 | A1 | 8/2018 |
| WO | 2018/195200 | A1 | 10/2018 |
| WO | 2019/206971 | A1 | 10/2019 |
| WO | 2020/074717 | A1 | 4/2020 |
| WO | 2020/094604 | A1 | 5/2020 |
| WO | 2020/210558 | A1 | 10/2020 |
| WO | 2020200739 | A1 | 10/2020 |

OTHER PUBLICATIONS

International Search Report issued in PCT/EP2021/086850 on Apr. 12, 2022 (5 pages).

Written Opinion of the International Searching Authority issued in PCT/EP2021/086850 on Apr. 12, 2022 (13 pages).

Norwegian Search Report issued in No. 20201433 mailed on Jul. 12, 2021 (2 pages).

Anh, Le Huy, Office Action in VN1202304766, mailed May 22, 2025, 4 pages, Intellectual Property Office of Vietnam, Hanoi, Vietnam.

Tang, Jinghong, Office Action in CN202180087184.8, mailed Jun. 25, 2025, 19 pages, The State Intellectual Property Office of the People's Republic of China, Beijing, China.

Waldstein, Martin, International Preliminary Report on Patentability in PCT/EP2021/086850, mailed Apr. 12, 2022, 11 pages, European Patent Office, Rijswijk, Netherlands.

Waldstein, Martin, Office Action in EP21843681.4, mailed Jun. 4, 2025, 4 pages, European Patent Office, Munich, Germany.

Phadthaising, Wissit, Office Action in TH2301003579, mailed Aug. 6, 2025, 10 pages, Department of Intellectual Property, Thailand.

* cited by examiner

ACCESS STATION FOR AN AUTOMATED STORAGE AND RETRIEVAL SYSTEM AND METHOD FOR USING SAME

FIELD OF THE INVENTION

The present invention relates to an access station for presentation of a storage container from an automated storage and retrieval system to a picker. The present invention also relates to an automated storage and retrieval system comprising a framework structure with such an access station. The present invention also relates to a method for presentation of a storage container from an automated storage and retrieval system to a picker.

BACKGROUND AND PRIOR ART

FIG. 1 discloses a typical prior art automated storage and retrieval system 1 with a framework structure 100 and FIGS. 2 and 3 disclose two different prior art container handling vehicles 201,301 suitable for operating on such a system 1.

The framework structure 100 comprises upright members 102, horizontal members 103 and a storage volume comprising storage columns 105 arranged in rows between the upright members 102 and the horizontal members 103. In these storage columns 105 storage containers 106, also known as bins, are stacked one on top of one another to form stacks 107. The members 102, 103 may typically be made of metal, e.g. extruded aluminium profiles.

The framework structure 100 of the automated storage and retrieval system 1 comprises a rail system 108 arranged across the top of framework structure 100, on which rail system 108 a plurality of container handling vehicles 201, 301 are operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201,301 in a first direction X across the top of the frame structure 100, and a second set of parallel rails 111 arranged perpendicular to the first set of rails 110 to guide movement of the container handling vehicles 201,301 in a second direction Y which is perpendicular to the first direction X Containers 106 stored in the columns 105 are accessed by the container handling vehicles through access openings 112 in the rail system 108. The container handling vehicles 201,301 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201,301 comprises a vehicle body 201a,301a, and first and second sets of wheels 201b,301b,201c,301c which enable the lateral movement of the container handling vehicles 201,301 in the X direction and in the Y direction, respectively. In FIGS. 2 and 3 two wheels in each set are fully visible. The first set of wheels 201b,301b is arranged to engage with two adjacent rails of the first set 110 of rails, and the second set of wheels 201c,301c is arranged to engage with two adjacent rails of the second set 111 of rails. At least one of the sets of wheels 201b,301b,201c,301c can be lifted and lowered, so that the first set of wheels 201b,301b and/or the second set of wheels 201c,301c can be engaged with the respective set of rails 110, 111 at any one time.

Each prior art container handling vehicle 201,301 also comprises a lifting device (not shown) for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201,301 so that the position of the gripping/engaging devices with respect to the vehicle 201,301 can be adjusted in a third direction Z which is orthogonal the first direction X and the second direction Y. Parts of the gripping device of the container handling vehicle 301 are shown in FIG. 3 indicated with reference number 304. The gripping device of the container handling device 201 is located within the vehicle body 201a in FIG. 2.

Conventionally, and also for the purpose of this application, $Z=1$ identifies the uppermost layer of storage containers, i.e. the layer immediately below the rail system 108, $Z=2$ the second layer below the rail system 108, $Z=3$ the third layer etc. In the exemplary prior art disclosed in FIG. 1, $Z=8$ identifies the lowermost, bottom layer of storage containers. Similarly, $X=1 \ldots n$ and $Y=1 \ldots n$ identifies the position of each storage column 105 in the horizontal plane $P_H$. Consequently, as an example, and using the Cartesian coordinate system X, Y, Z indicated in FIG. 1, the storage container identified as 106' in FIG. 1 can be said to occupy storage position $X=10$, $Y=2$, $Z=3$. The container handling vehicles 201,301 can be said to travel in layer $Z=0$, and each storage column 105 can be identified by its X and Y coordinates.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y- and Z-direction.

Each prior art container handling vehicle 201,301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the central cavity container handling vehicles 101 may have a footprint which is larger than the lateral area defined by a storage column 105, e.g. as is disclosed in WO2014/090684A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks.

WO2018/146304, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201,301 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120.

In FIG. 1, the first port column 119 may for example be a dedicated drop-off port column where the container handling vehicles 201,301 can drop off storage containers 106 to be transported to an access or a transfer station, and the second port column 120 may be a dedicated pick-up port column where the container handling vehicles 201,301 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1, but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119,120 and the access station.

If the port columns 119,120 and the access station are located at different levels, the conveyor system may comprise a lift device with a vertical component for transporting the storage containers 106 vertically between the port column 119,120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201,301 is instructed to retrieve the target storage container 106 from its position and transport it to the drop-off port column 119. This operation involves moving the container handling vehicle 201,301 to a location above the storage column 105 in which the target storage container 106 is positioned, retrieving the storage container 106 from the storage column 105 using the container handling vehicle's 201,301 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 1 may have container handling vehicles 201,301 specifically dedicated to the task of temporarily removing storage containers 106 from a storage column 105. Once the target storage container 106 has been removed from the storage column 105, the temporarily removed storage containers 106 can be repositioned into the original storage column 105. However, the removed storage containers 106 may alternatively be relocated to other storage columns 105.

When a storage container 106 is to be stored in one of the columns 105, one of the container handling vehicles 201,301 is instructed to pick up the storage container 106 from the pick-up port column 120 and transport it to a location above the storage column 105 where it is to be stored. After any storage containers 106 positioned at or above the target position within the stack 107 have been removed, the container handling vehicle 201,301 positions the storage container 106 at the desired position. The removed storage containers 106 may then be lowered back into the storage column 105, or relocated to other storage columns 105.

For monitoring and controlling the automated storage and retrieval system 1, e.g. monitoring and controlling the location of respective storage containers 106 within the framework structure 100, the content of each storage container 106; and the movement of the container handling vehicles 201,301 so that a desired storage container 106 can be delivered to the desired location at the desired time without the container handling vehicles 201,301 colliding with each other, the automated storage and retrieval system 1 comprises a control system 500 which typically is computerized and which typically comprises a database for keeping track of the storage containers 106.

An access station for picking storage containers is disclosed in WO2020/074717. This access station comprises an entry conveyor and an exit conveyor. The access station therefore has a footprint exceeding the width/length of a storage column. There will therefore be some distance between the picking zone of two adjacent access stations.

The access station disclosed in WO2020/074717 also has many moving or rotating components, particularly associated with the conveyors, that are prone to wear and regularly require maintenance.

An objective of the present invention is therefore to provide a more compact access station where picking zones can be arranged closer to each other.

A further objective of the present invention is to reduce the complexity of the access station, particularly regarding the number of moving components.

SUMMARY OF THE INVENTION

The present invention relates to an access station for presentation of a storage container from an automated storage and retrieval system to a picker, wherein the access station comprises:

a access module comprising a frame defining a drawer compartment provided within the frame;
  a drawer comprising a drawer base and a drawer front;
    wherein the drawer is movably connected to the frame;

a first actuator for moving the drawer relative to the frame between a presentation position in which the drawer is protruding from the drawer compartment and a retracted position in which the drawer is retracted within the drawer compartment; wherein the drawer base comprises a support on which the storage container can be supported in a front position or in a rear position;

wherein the access station comprises a second actuator for moving the storage container from the front position to the rear position;

wherein the storage container is presented to the picker when the storage container is in the front position and when the drawer is in the presentation position.

In one aspect, the access station comprises a front opening, wherein a portion of the drawer is configured to protrude from a front side of the front opening when it is in the presentation position.

In one aspect, the front opening is oriented in a vertical plane. In one aspect, the drawer is movable in a horizontal plane relative to the frame.

In one aspect, the access station comprises a top opening through which a storage container is retrievable from the drawer and through which a storage container is receivable by the drawer.

In one aspect, the storage container is retrievable from the drawer through the top opening in a vertical direction. In one aspect, the storage container is received by the drawer through the top opening in a vertical direction.

In one aspect, the front position is located below the top opening when the drawer is in the retracted position and wherein the rear position is located below the top opening when the drawer is in the presentation position.

In one aspect, the access station is configured to:

receive a storage container in the front position when the drawer is in the retracted position;

allow a storage container to be retrieved from the rear position when the drawer is in the presentation position.

In one aspect, the access station is configured to:

move a storage container from the front position to the rear position when the drawer is in the retracted position or while the drawer is moving from the presentation position to the retracted position.

In one aspect, the access station comprises a retracted position sensor for measuring that the drawer is in the retracted position and a presentation position sensor for measuring that the drawer is in the presentation position.

In one aspect, the first actuator comprises a motor, an actuating element moved by the motor and a guide for guiding the movement of the actuating element.

In one aspect, the second actuator comprises a motor, an actuating element moved by the motor and a guide for guiding the movement of the actuating element.

According to the above, retrieval of a storage container is performed while the picker is performing a picking operation or a supplying operation from the storage container when it is in the first position of the drawer base and the drawer is in the presentation position.

In one aspect, the access station is defined with a buffer position above the top opening. A further storage container may be transported from the automated storage and retrieval system to the buffer position while the picker is performing the picking operation or the supplying operation.

According to this buffer position, efficiency of the access station may be achieved. In one aspect, the storage container is held in the buffer position by means of a container handling vehicle.

In one aspect, the frame comprises vertical side guiding plates for guiding the drawer front as it extends out to the presentation position and as it retracts to the retracted position.

In one aspect, the vertical side guiding plates are a snug fit to the drawer front to reduce gaps and a possible risk of crushing fingers/hands during movement of the drawer. In one aspect, a resilient material is positioned between the guiding plates and the drawer front to reduce gaps and risks further.

In one aspect, the frame comprises a horizontal lower guiding plate for guiding the drawer front. Also this lower guiding plate is a snug fit to the drawer front to reduce risk of crushing fingers/hands during movement of the drawer.

In one aspect, the drawer base comprises wheels running on the horizontal lower guiding plate during the movement of the drawer between its retraced position and its presentation position. The side guiding plates and the lower guiding plate are fixed in relation to the access module and the automated storage and retrieval system and is therefore visible for the picker and other persons working near the framework structure of the system. Hence, when the drawer is moved from the retracted position to the presentation position, this movement will not create a surprising obstacle for nearby personnel, as the drawer front is moved in the space between the vertical guiding plates and the lower, horizontal guiding plate.

In one aspect, the frame comprises a guard defining an upper border of the front opening.

In one aspect, the side guiding plates, the lower guiding plate and the guard together define the borders of the front opening.

In one aspect, the access station comprises a safety mechanism for preventing an object from being squeezed between the drawer front and the guard during movement of the drawer from the presentation position to the retracted position.

According to this safety mechanism, the risk of injuries for the picker is reduced, in particular pinch injuries of hands/fingers when parts of the access station are moving.

In one aspect, the safety mechanism comprises:

a flap element provided adjacent to, and on the front side of, the guard;

a sensor for sensing movement of the flap element relative to the guard.

In one aspect, the flap element is movably connected to a flap holding structure secured to the frame.

In one aspect, the flap holding structure is secured to the guard. In one aspect, the flap element is movably connected to the flap holding structure by means of one or more hinges.

In one aspect, the flap holding structure is a supporting structure for a user interface system.

The sensor may be an integrated circuit type of sensor, such as an accelerometer etc., connected to the first actuator. The sensor may be a push-button type of security switch, which is activated by the movement of the flap element, wherein the security switch is connected to the first actuator. Sensors of this type are known to a person skilled in the art.

In one aspect, the support comprises rollers for supporting the storage container in the rear position.

In one aspect, the support comprises a weight sensor for measuring a weight of the storage container when supporting the storage container in the front position.

In one aspect, the second actuator comprises an electric motor and an actuating element movable by means of the electric motor.

In one aspect, the drawer front and the guard are vertically aligned when the drawer is in the retracted position.

In one aspect, the access station may comprise two or more access modules, wherein each access module comprises a drawer. The access modules may be positioned adjacent to each other or at a distance from each other.

In one aspect, the drawer comprises a container stop for preventing movement of the storage container from the front position towards the rear position when the drawer is in the presentation position.

The present invention also relates to an automated storage and retrieval system comprising a framework structure, wherein the framework structure comprises:

upright members;

horizontal members;

a storage volume comprising storage columns provided between the members, wherein storage containers are stackable in stacks within the storage columns;

a rail system provided on top of the members;

wherein the automated storage and retrieval system comprises container handing vehicles moving on the rail system;

wherein the automated storage and retrieval system comprises an access station according to any one of the above claims, wherein the drawer compartment is provided within the framework structure and wherein the drawer is at least partially protruding from the framework structure in the presentation position.

In one aspect, the frame comprises lintels for supporting upright members of the framework structure.

In one aspect, the front opening is provided in a vertical plane in line with, or adjacent to, a front edge of side panels of the framework structure.

In one aspect, the container handling vehicles are able to:

retrieve the storage container from the drawer via one storage column;

deliver a further storage container to the drawer via the one storage column.

In one aspect, the container handling vehicles are able to:

hold the further storage container in the buffer position until the drawer is ready to receive the further storage container.

In one aspect, the frame has a footprint area corresponding to an area of two storage columns and their surrounding upright members within the framework structure. The footprint area has a width corresponding to one storage column width and a depth corresponding to two storage columns depths (plus the surrounding upright members). One storage column is used for vertical transportation of storage containers. The upper parts of the one other storage columns can be used for storage of storage containers. However, the storage height of this column is reduced by the height of the frame.

In one aspect, the frame has a footprint area corresponding to an area of three storage columns and their surrounding upright members within the framework structure. The footprint area has a width corresponding to one storage column width and a depth corresponding to tree storage columns depths (plus the surrounding upright members). One storage column is used for vertical transportation of storage containers. The upper parts of the two other storage columns can be used for storage of storage containers. However, the storage height of these columns is reduced by the height of the frame.

In both of the above two alternatives, picking zones of two adjacent access modules can be arranged closer to each other.

The present invention also relates to a method for presentation of a storage container from an automated storage and retrieval system to a picker, wherein the method comprises the following steps:

a) receiving a first storage container in a front position of a drawer when the drawer is in a retracted position within an access module;

b) moving the drawer to a presentation position in which the first storage container is presented to the picker;

c) moving the drawer to a retracted position within the access module;

d) moving the first storage container from the front position to the rear position of the drawer;

e) receiving a second storage container in the front position of the drawer when the drawer is in the retracted position;

f) moving the drawer to the presentation position in which the second storage container is presented to the picker;

g) allowing the first storage container to be retrieved from the rear position of the drawer when the drawer is in the presentation position;

h) moving the drawer to the retracted position within the access module;

i) moving the second storage container from the front position to the rear position of the drawer.

In one aspect, the method step c) or d) further comprises the following step:

holding the second storage container in a buffer position until the drawer is ready to receive the second storage container.

The present invention also relates to an automated storage and retrieval system comprising a framework structure, wherein the framework structure comprises:

upright members;

horizontal members;

a storage volume comprising storage columns provided between the members, wherein storage containers are stackable in stacks within the storage columns;

a rail system provided on top of the members;

wherein the automated storage and retrieval system comprises:

an access station;

container handing vehicles moving on the rail system;

characterized in that:

the framework structure comprises an access station compartment;

the automated storage and retrieval system comprises an access station insertable into and retrievable from the access station compartment.

It should be noted that the automated storage and retrieval system may be in normal operation during insertion and retrieval of the access station, as long as the container handling vehicles are not allowed to use the storage column arranged above the top opening when the access station is inserted into the access station compartment.

In one aspect, the access station is insertable into and retrievable from the access station compartment via a side opening in the framework structure.

In one aspect, the access station comprises wheels for rolling the access station into and out from the access station compartment.

In one aspect, the access station comprises a top opening aligned below one of the storage columns when the access station is inserted into the access station compartment, wherein at least one of the container handling vehicles is configured to supply a storage container to the access station through the storage column aligned with the top opening and to retrieve a storage container from the access station through the storage column aligned with the top opening.

In one aspect, the horizontal members of the framework structure are integrated with the rail system.

The above solutions may be relevant for self-service automated storage and retrieval systems, wherein customers use the access stations themselves. Here, the risk of injuries may be higher than in automated storage and retrieval systems wherein professional operators are using the access stations. In addition, some such self-service automated storage and retrieval systems may have fewer staff members capable of performing service, maintenance or reparation of the access stations should malfunctioning occur. Hence, it is desired to have an automated storage and retrieval systems wherein a malfunctioning access station can be retrieved from the system and replaced with a functioning access station in an easy way. The malfunctioning access station may then be transported to a different location for service, maintenance or reparation.

The only operation needed in addition to physically retrieving/inserting the access station is to disconnect/connect a power cable and possibly also a communication cable. Preferably, there is some sort of locking mechanism for locking the access station to the access station compartment.

BRIEF DESCRIPTION OF THE DRAWINGS

Following drawings are appended to facilitate the understanding of the invention. The drawings show embodiments of the invention, which will now be described by way of example only, where.

DETAILED DESCRIPTION OF THE INVENTION

Figure 1:
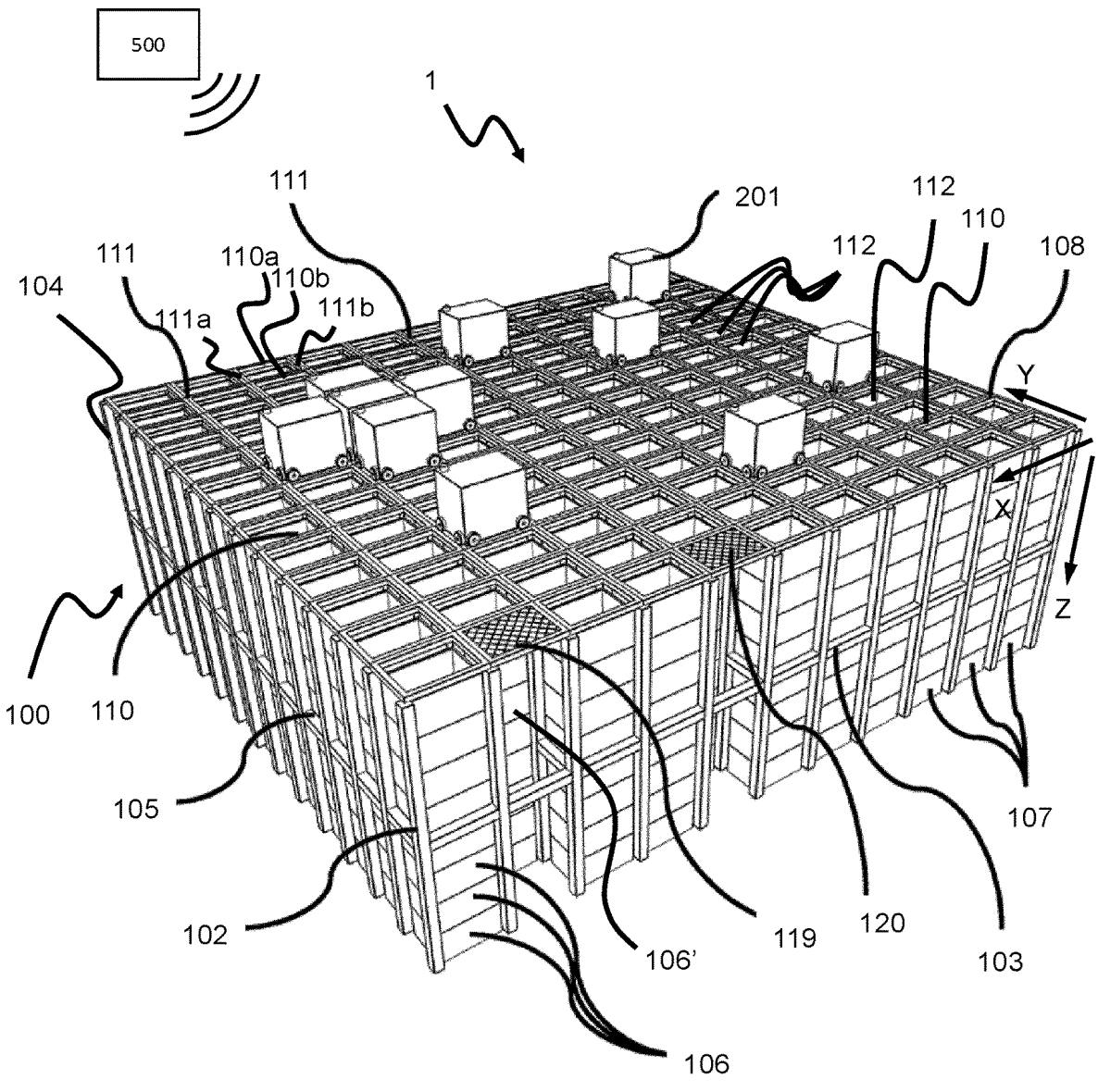
FIG. 1 is a perspective view of a framework structure of a prior art automated storage and retrieval system.

In the following, embodiments of the invention will be discussed in more detail with reference to the appended drawings. It should be understood, however, that the drawings are not intended to limit the invention to the subject-matter depicted in the drawings.

Figure 2:
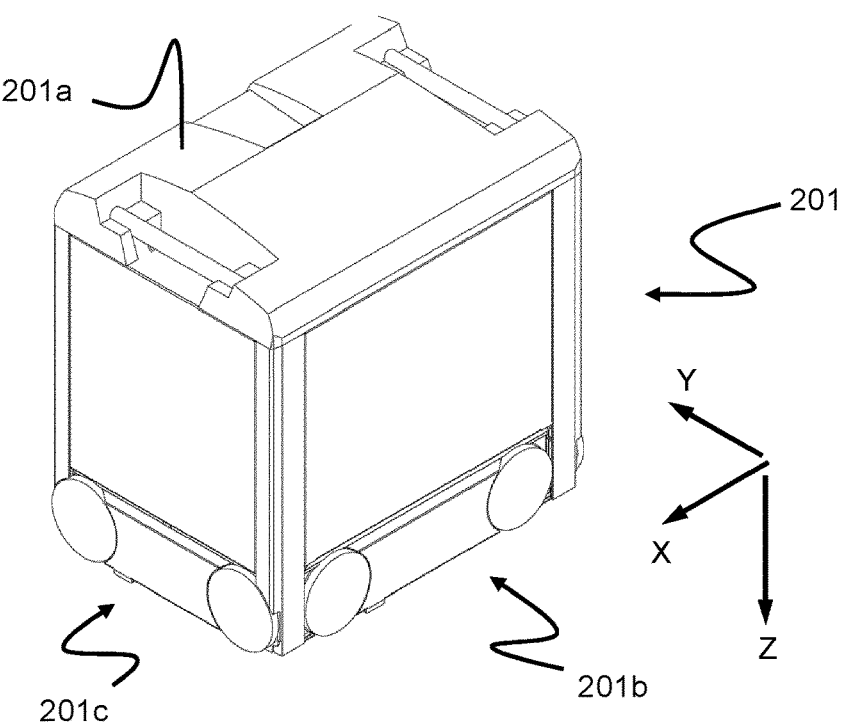
FIG. 2 is a perspective view of a prior art container handling vehicle having a centrally arranged cavity for carrying storage containers therein.
Figure 3:
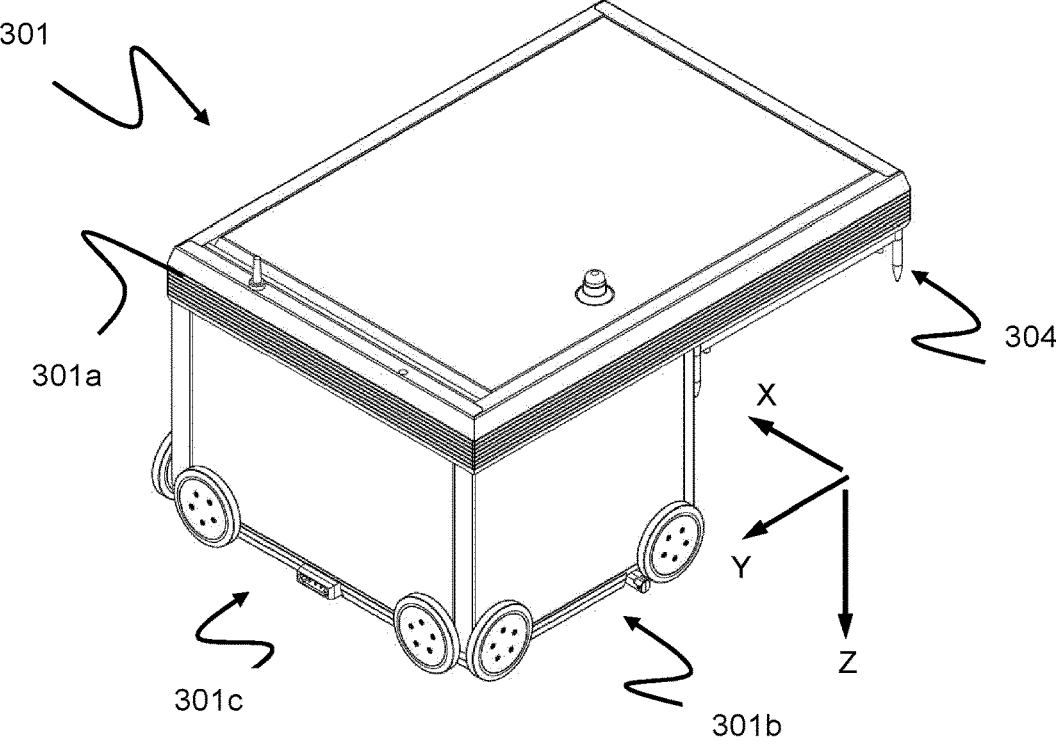
FIG. 3 is a perspective view of a prior art container handling vehicle having a cantilever for carrying storage containers underneath.

The framework structure 100 of the automated storage and retrieval system 1 is constructed in accordance with the prior art framework structure 100 described above in connection with FIGS. 1-3, i.e. a number of upright members 102 and a number of horizontal members 103, which are supported by the upright members 102, and further that the framework structure 100 comprises a first, upper rail system 108 in the X direction and Y direction.

The framework structure 100 further comprises storage compartments in the form of storage columns 105 provided between the members 102, 103, where storage containers 106 are stackable in stacks 107 within the storage columns 105.

The framework structure 100 can be of any size. In particular it is understood that the framework structure can be considerably wider and/or longer and/or deeper than disclosed in FIG. 1. For example, the framework structure 100 may have a horizontal extent of more than 700×700 columns and a storage depth of more than twelve containers.

Figures 4, 5:
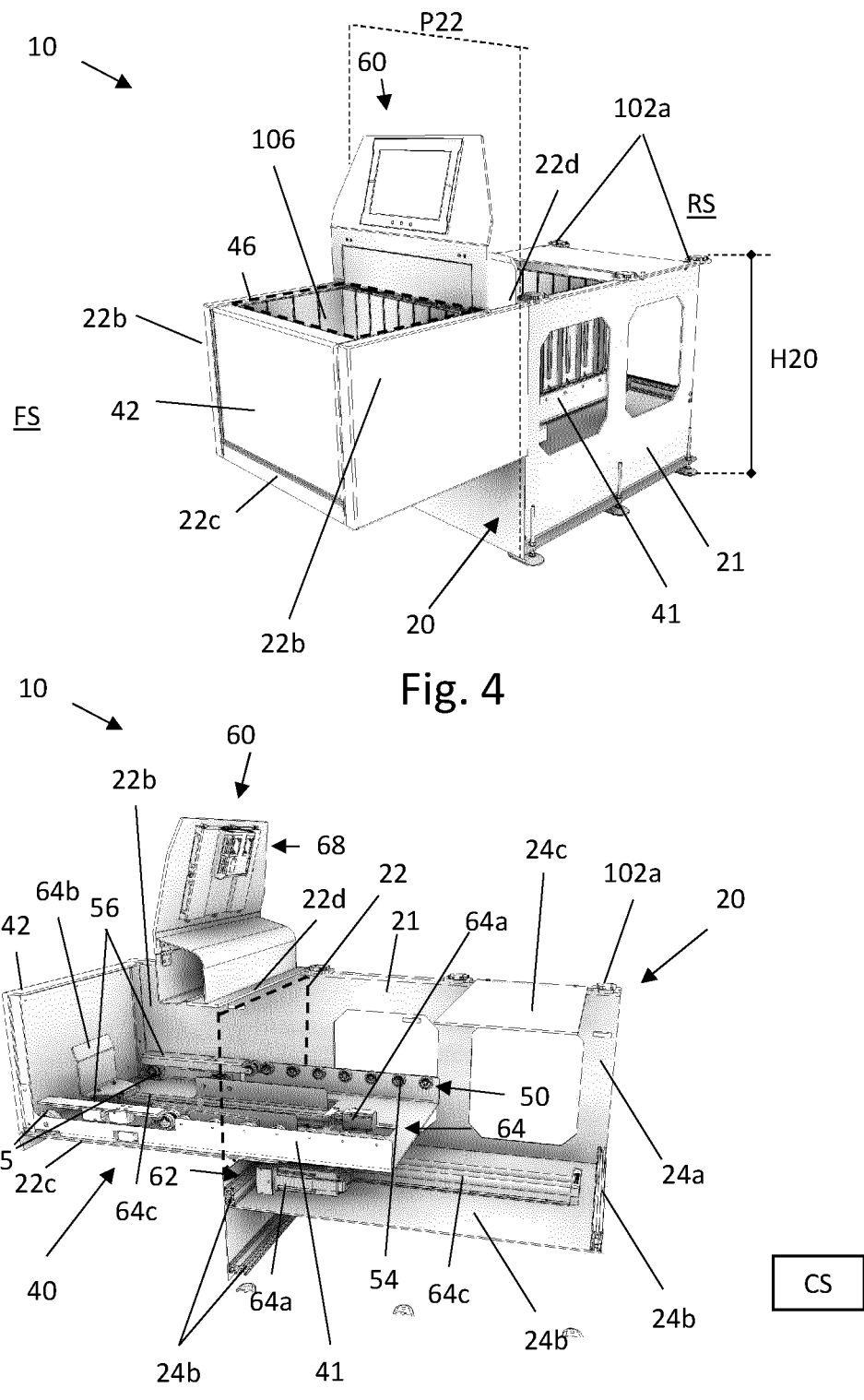
FIG. 4 is a front perspective view of an embodiment of an access station containing two storage containers.
FIG. 5 is a rear perspective view of the access station of FIG. 4, where parts of the frame has been removed and where the access station does not contain any storage containers.

It is now referred to FIGS. 4 and 5, where an access station 10 is shown. The access station allows a storage container 106 from an automated storage and retrieval system 1 to be presented to a picker P (the picker P being shown in FIG. 11). The access station 10 may also be referred to as a port.

The access station 10 comprises an access module 20 comprising a frame 21 defining a drawer compartment 25 provided within the frame 21. The drawer compartment 25 is also indicated as a dashed box 25 in FIG. 7b.

The access station 10 further comprises a drawer 40 movably connected to the frame 21.

Figures 7A, 7B, 7C:
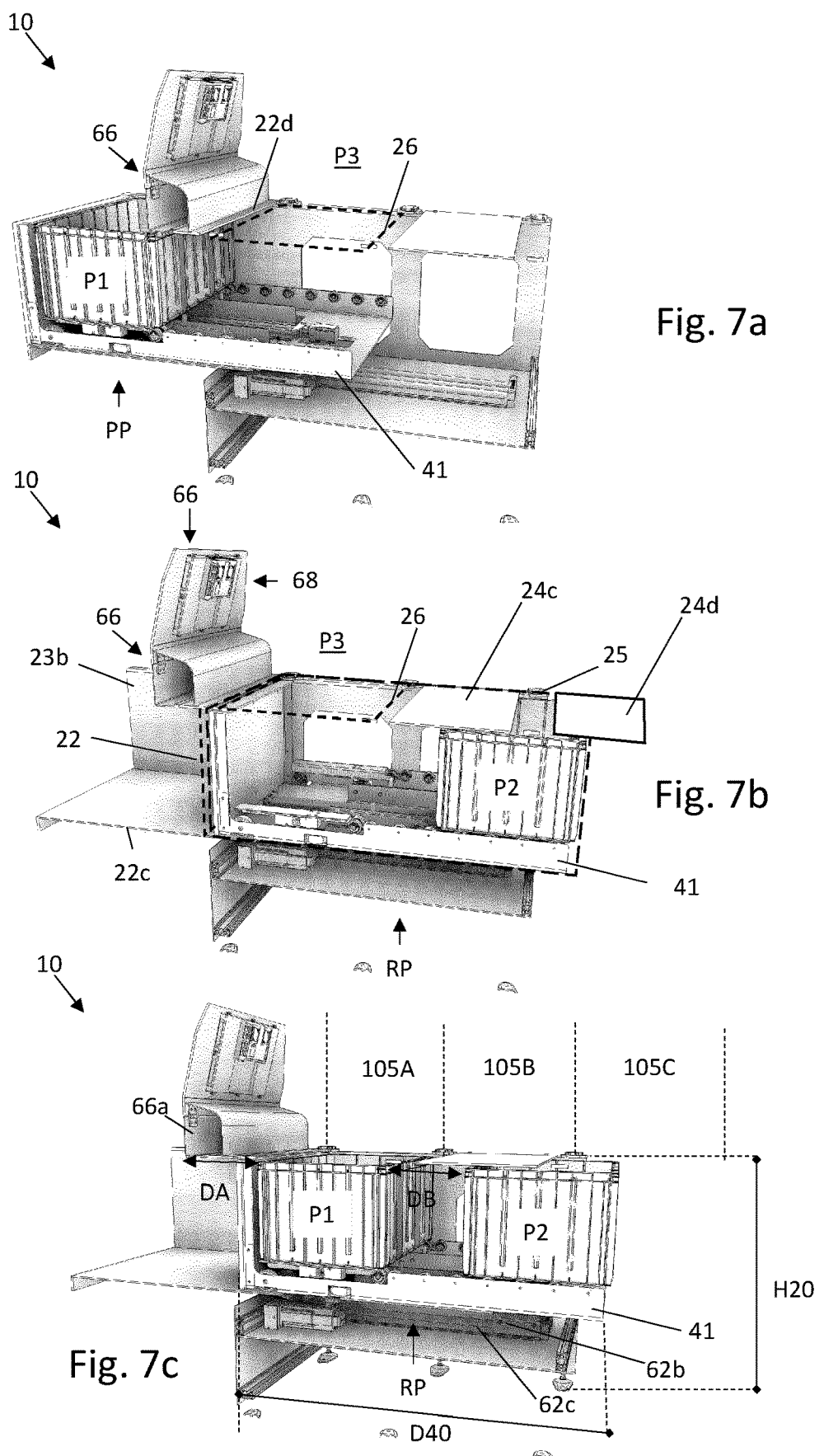
FIG. 7a-d show the operation of the access station of FIG. 4.

In FIG. 5 and FIG. 7b, it is further shown that the access station 10 comprises a front opening indicated as a dashed rectangle 22. The front opening 22 is typically oriented in a vertical plane P22 shown in FIG. 4.

It is further shown in FIG. 7b that the access station 10 comprises a top opening indicated as a dashed rectangle 26. The top opening 26 is provided in a horizontal plane.

It is also shown in FIG. 4 that the access station 10 comprises an access opening 46 through which the content of the storage container 106 is accessible for the picker P.

The access station 10 further comprises a first actuator 62 for moving the drawer 40 relative to the frame 21 between two positions referred to as a presentation position PP and a retracted position RP. The presentation position PP is shown in FIGS. 5 and 7a. Here, the drawer 40 is protruding from the drawer compartment 25 and a storage container 106 is presented to a picker P. The retracted position RP is shown in FIGS. 7b and 7c. Here, the drawer 40 is retracted within the drawer compartment 25 and hence, no storage container 106 is presented to the picker P.

The access station 10 further comprises a second actuator 64. The second actuator 64 and other details of the access station 10 will be described in detail below.

The access station 10 may also comprise a control system CS for controlling the first and second actuators 62, 64. The control system CS may be a part of the control system 500 for the automated storage and retrieval system, or the control system CS may be a separate control system in communication with the control system 500 for the automated storage and retrieval system.

Drawer 40

Figure 7D:
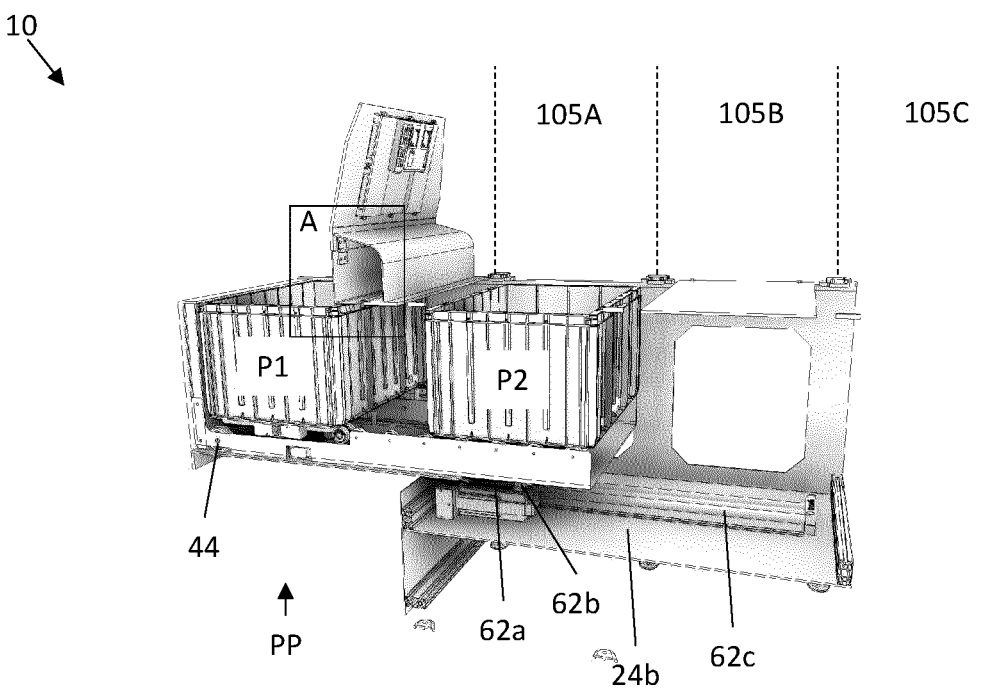
Figure 8:
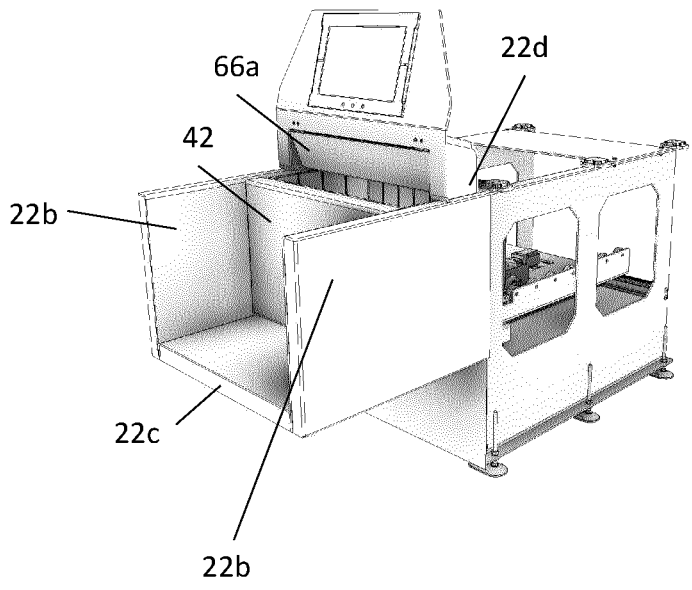
FIG. 8 is a front perspective view of the access station of FIG. 4 where the drawer is moved from the presentation position to the retracted position.

The drawer 40 comprises a drawer base 41 movably connected to the frame 21 and a drawer front 42. The drawer base 41 comprises a support 50 on which two storage containers 106 can be supported, as shown in FIGS. 7c and 7d. The position of the storage container 106 being located closest to the front 42 is referred to as a front position P1, while the position of the storage container 106 being located distant from the front 42 is referred to as a rear position P2.

Figure 6:
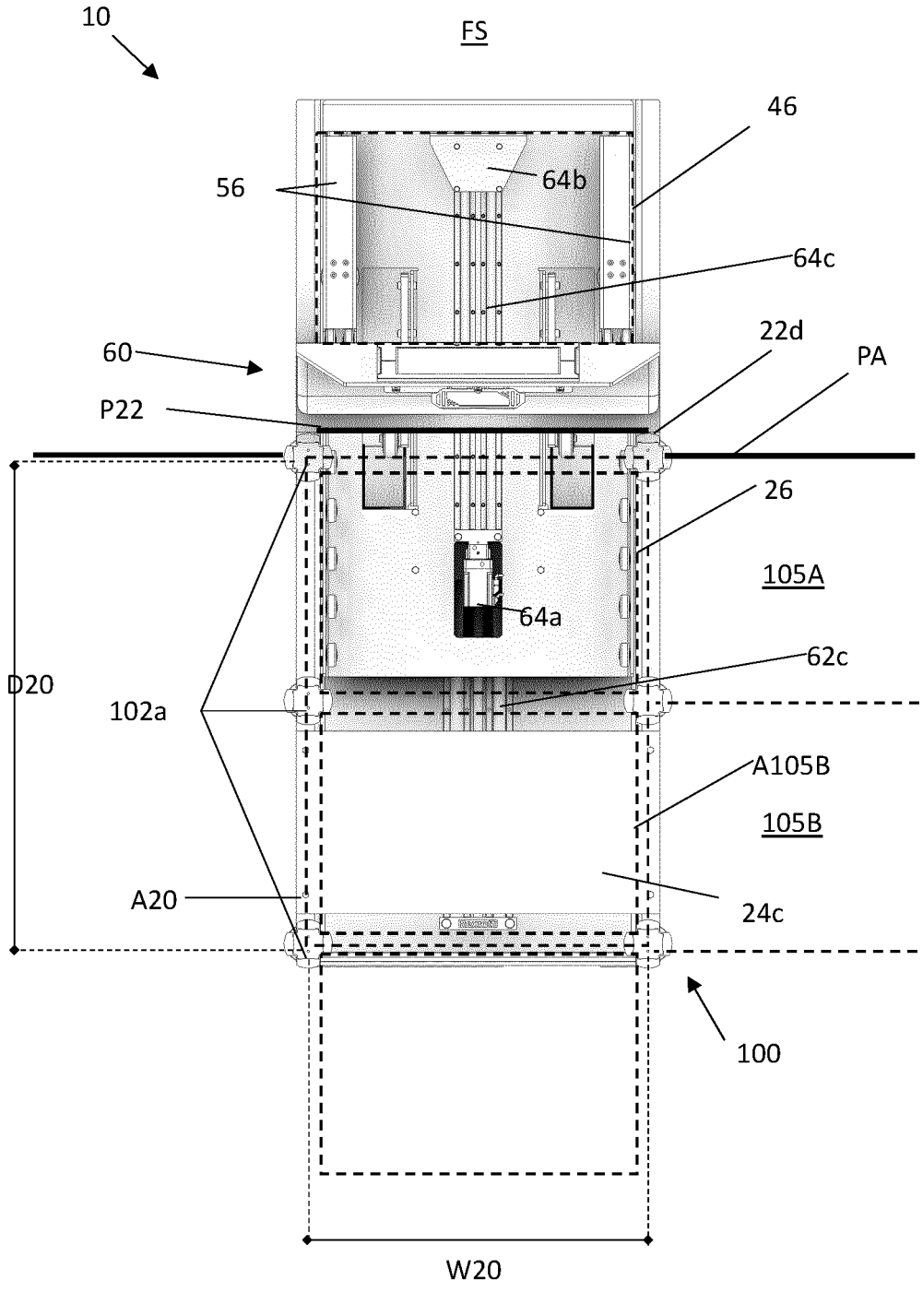
FIG. 6 is a top view of the access station of FIG. 4 without any storage containers.

It is now referred to FIGS. 5 and 6. Here it is shown that the support 50 comprises rollers or wheels 54 for supporting the storage container 106 in the rear position P2. The support 50 also comprises a weight sensor 56 for measuring a weight of the storage container 106 when supporting the storage container 106 in the front position P1. A storage container 106 may slide along the weight sensor 56 and further onto the wheels 54 without much resistance.

The second actuator 64 is mounted to the drawer base 41 and comprises an electric motor 64a and an actuating element 64b in the form of a vertical plate movable by means of the electric motor 64a along a guide or rail 62c. The second actuator 64 may then push a storage container 106 from the first position P1 to the second position P2, as will be described further in detail below. It should be noted that due to the sliding surface of the weight sensor 56 and due to the wheels 54, the power required to move the storage container 106 is relatively low.

The electric motor 64a is here a linear motor. However, the electric motor 64a could also be a rotating motor for moving the actuating element 64b by means of a chain drive, a belt drive etc.

The drawer 40 is provided within the drawer compartment 25 in the retracted position RP and at least partially protruding from the framework structure 100 in the presentation position PP. In the presentation position PP, the storage container in the first position P1 is accessible for the picker P, while the storage container in the second position P2 is still provided withing the drawer compartment 25.

The drawer further comprises wheels 44, 45 secured below the drawer base 41, on the rear side of the drawer front 42. The wheels 44,45 are running on plate 24c2 and on the horizontal lower guiding plate 22c during the movement of the drawer between its retraced position and its presentation position. In the present embodiment, the horizontal lower guiding plate 22c is a continuation of the plate 24c2, i.e. they are made as one plate member.

Access Module 20

In FIG. 4 and FIG. 5 it is shown that the frame 21 comprises two side plates 24a and cross members 24b connecting the two side plates to each other. The two side plates 24a are also connected to each other by means of an upper horizontal cross plate 24c1, where storage containers 106 can be stacked above each other on the horizontal cross plate 24c1 in column 105B. The two side plates 24a are also connected to each other by means of a lower cross plate 24c2.

Figure 9:
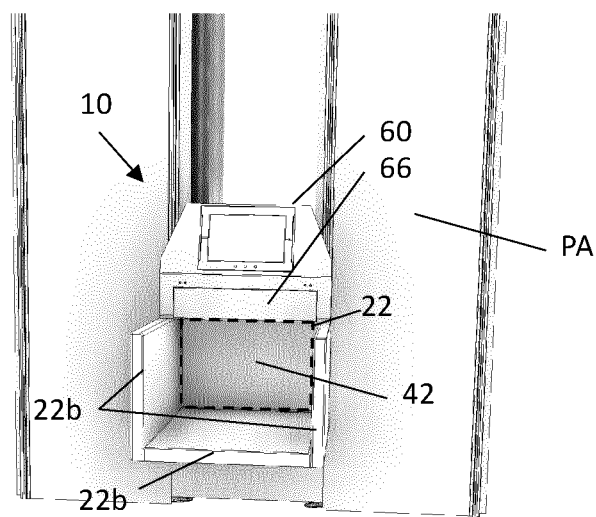
FIG. 9 is a front perspective view of the embodiment of the access station integrated with a framework of an automated storage and retrieval system.
Figure 10:
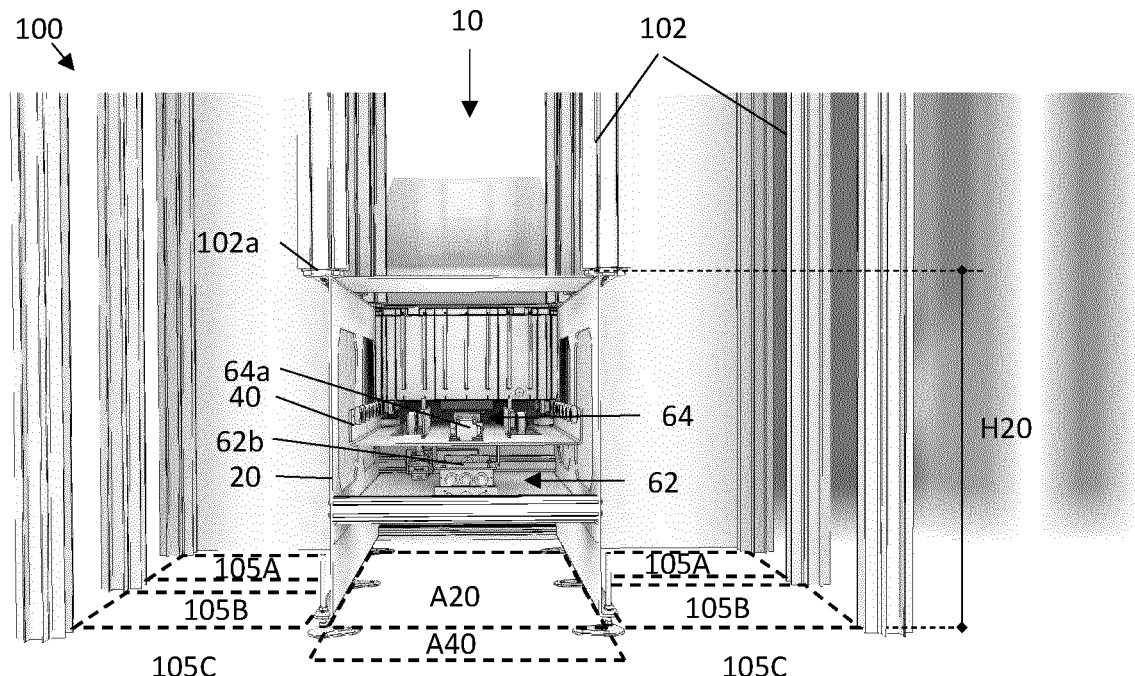
FIG. 10 is a rear view of the access station in FIG. 9.

It is now referred to FIGS. 6, 9 and 10, wherein it is shown that the access module 20 is partially integrated with the framework structure 100. In FIG. 6, the plane P22 of the front opening 22 is defining a separation plane between a front side FS outside of the framework structure 100 and a rear side RS inside of the framework structure 100. The plane P22 is parallel to, and has a short distance (preferably a few centimetres) from, panels PA secured to the outer upright members 102 of the framework structure 100. Alternatively, the panels themselves may be define the separation plane between the front side FS and the rear side RS.

The rear side RS is shown in FIG. 10. Here, it is shown that the frame 21 comprises lintels 102a for supporting upright members 102 of the framework structure 100. Hence, the frame 21 is forming a support for some of the upright members 102 of the framework structure 100.

In FIG. 10, a row of storage columns 105A are located adjacent to the panels PA. The next row of storage columns is indicated as storage columns 105B, and the next row of storage columns again is referred to as storage columns 105C.

As shown, the frame 21 has a footprint area A20 within the framework structure 100 corresponding to an area of two storage columns including at least parts of the area of surrounding upright members 102. In FIG. 6, the area of the top opening 26 is substantially equal to the area of one storage column 105A, which again is equal to an area A105B of the adjacent storage column 105B, which again is equal to the area of the other storage columns. As shown, the footprint area A20 is larger than the sum of the area of the top opening 26 and the area A105B, as parts of the areas of surrounding upright members 102 are included in the footprint area A20. The footprint area A20 is here defined as the area limited by the centre axis through six upright members enclosing two storage columns 105A, 105B.

In FIG. 6, it is further shown that the footprint area A20 has a width W20 corresponding to one storage column width and a depth D20 corresponding to two storage columns depths measured between adjacent centre axis of the upright members 102.

It should be noted that above, the footprint area A20 is defined as the rear side footprint area A20, i.e. the footprint area A20 within the framework structure 100. This footprint area A20 is an indication of reduction of the storage capacity of the automated retrieval and storage system 1 due to the access station 10.

In an alternative embodiment, the two side plates 24a are also connected to each other by means of a horizontal cross plate 24d (shown in FIG. 7b), where storage containers 106 can be stacked above each other on the horizontal cross plate 24d in column 105C. In this case, the frame 21 has a footprint area A20 within the framework structure 100 corresponding to an area of three storage columns including at least parts of the area of surrounding upright members 102. It should be noted that the function of the horizontal cross plate 24d may be provided with a separate plate connected between upright members 102 of the framework structure 100. Hence, the function of the horizontal cross plate 24d is not necessarily a part of the access station 10 per se.

In FIG. 9, it is shown that on the front side FS, the frame 21 comprises vertical side guiding plates 22b for guiding the drawer front 42 as it extends out to the presentation position PP and as it retracts to the retracted position RP. The frame 21 also comprises a horizontal lower guiding plate 22c for guiding the lower end of the drawer front 42.

The vertical side guiding plates 22b and the lower guiding plate 22c are a snug fit to the drawer front 42 to reduce gaps and a possible risk of crushing fingers/hands during movement of the drawer 40.

The side guiding plates 22b and the lower guiding plate 22c are fixed in relation to the access station and the automated storage and retrieval system 1 and is therefore visible for the picker P and other persons working near the framework of the system 1. Hence, when the drawer 40 is moved from the retracted position RP to the presentation position PP, this movement will not create a surprising obstacle for nearby personnel, as the drawer front 42 is moved in the space between the vertical guiding plates 22b and the lower, horizontal guiding plate 22c.

It is now referred to FIG. 5, wherein it is shown that the frame 21 comprises a guard 22d defining an upper border of the front opening 22. The side guiding plates 22b, the lower guiding plate 22c and the guard 22d in the vertical plane P22 together define the borders of the front opening 22, as indicated in FIG. 5 and in FIG. 9.

The first actuator 62 is mounted to the lower cross plate 24c2 and comprises a linear motor 62a, an actuator element 62b and a guide 62c for guiding the linear movement of the actuator element 62b. The actuator element 62b is connected to the underside of the drawer 40, as shown in FIG. 7c and FIG. 10.

Safety Mechanism

Figure 11:
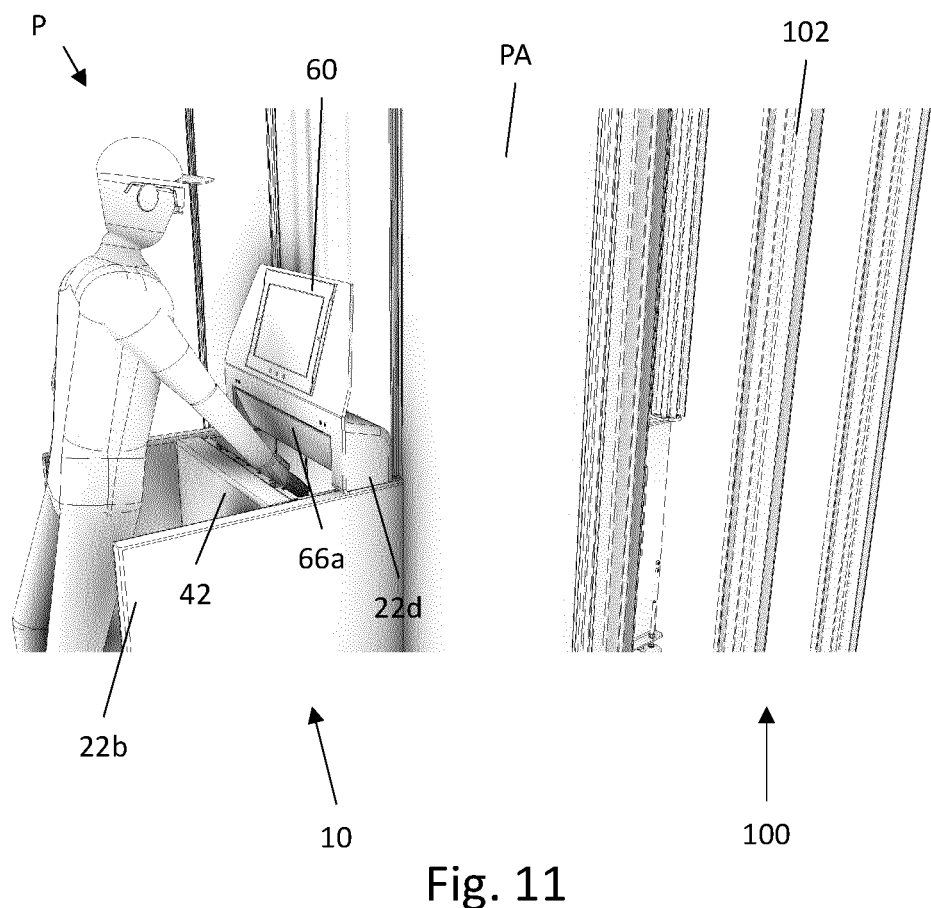
FIG. 11 illustrates a picker with his hands in a position where the safety mechanism is activated.
Figure 12:
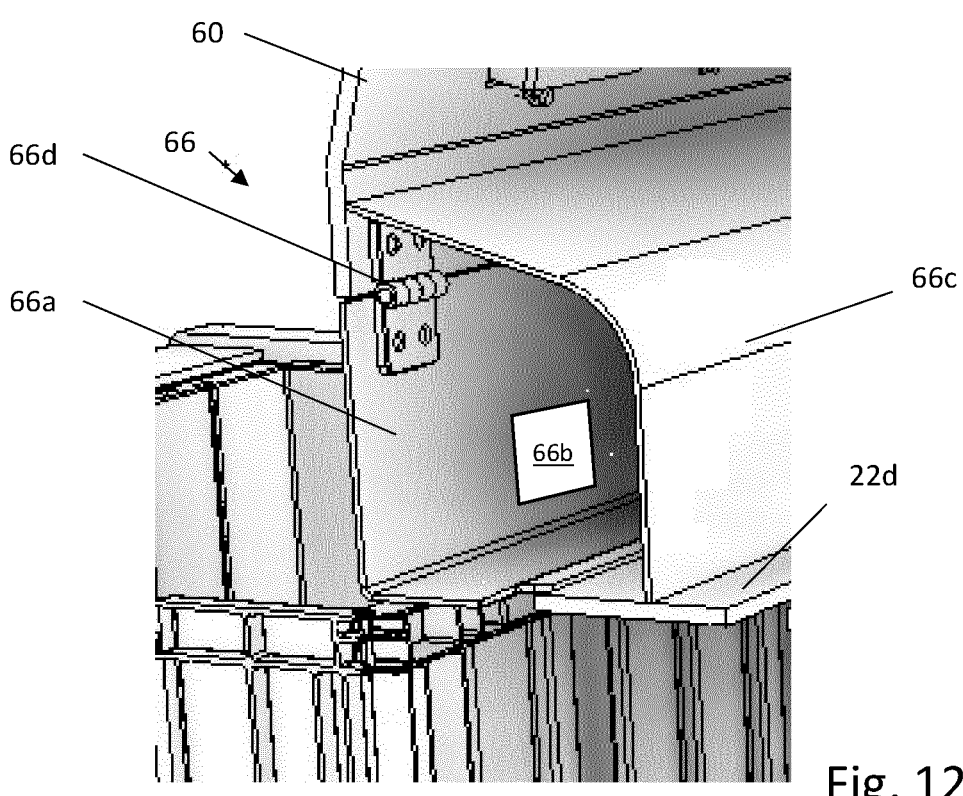
FIG. 12 is an enlarged view of box A in FIG. 7d.

It is now referred to FIGS. 11 and 12, where it is shown that the access station 10 comprises a safety mechanism 66 for preventing an object (typically the pickers fingers/hands) from being squeezed between the drawer front 42 and the guard 22d during movement of the drawer 40 from presentation position PP to the retracted position RP.

The safety mechanism 66 comprises a flap element 66a provided adjacent to, and on the front side FS of, the guard 22d, and a sensor 66b for sensing movement of the flap element 66a relative to the guard 22d. The flap element 66a is movably connected to a flap holding structure 66c secured to the frame 21 by means of one or more hinges 66d.

In one aspect, the flap holding structure 66c is secured to the guard 22d. In one aspect, the flap element 66a is movably connected to the flap holding structure 66c by means of one or more hinges 66d.

The flap holding structure 66c is a supporting structure for a user interface system 60, for example comprising a touch screen or other type of user interface.

The sensor 66b may be an integrated circuit type of sensor, such as an accelerometer etc., connected to the first actuator 62. The sensor 66b may be a push-button type of security switch, which are activated by the movement of the flap element 66a. Sensors 66b of this type are known to a person skilled in the art.

When activated, the sensor 66b controls the first actuator 62 to stop the movement of the drawer or controls the first actuator 62 to move the drawer 40 out from the compartment 25 again. The sensor 66b may also control the second actuator 64 to stop the movement of the actuating element 64b or to move in the reverse direction. The sensor 66b may be connected directly to the first and/or second actuator 62,64. Alternatively, the sensor 66b is connected to the first and/or second actuator 62,64 via the control system CS.

It is now referred to FIG. 7c, where two double-headed arrows are referred to as DA and DB. The first double-headed arrow indicates a first distance DA between the flap element 66a and the storage container in 106 in the front position P1. This distance is needed to be able to obtain access to the storage container 106 in the first position when the drawer 40 is in the presentation position PP and to be able to lift the storage container in the first position P1 up/down through the top opening 26 when the drawer is in the retracted position RP. The second double-headed arrow indicates a second distance DB between the storage container 106 in the front position P1 and storage container 106 in the rear position P2. This distance is needed to be able to be able to lift the storage container in the second position P2 up/down through the top opening 26 when the drawer is in the presentation position PP. The first distance DA is equal to, or substantially equal to the second distance DB.

In FIG. 7c, it is shown that the drawer 40 in the retracted position RP projects into the third column 105C. Hence, even if the frame 21 only has a footprint area A20 of two storage columns including at least parts of the area of surrounding upright members 102, the drawer 40 will prevent storage containers 106 from being stacked in full height in the third storage column 105C. This is indicated as area A40 in FIG. 10.

However, the plate 24d described above may allow storage containers to be stacked also in the third column 105C, the third column 105C having a reduced stacking height corresponding to the height H20 of the frame 21.

Operation of the Access Station

The different steps for operation of the access station 10 are shown in FIG. 13a-h.

Figures 13A, 13B, 13C, 13D:
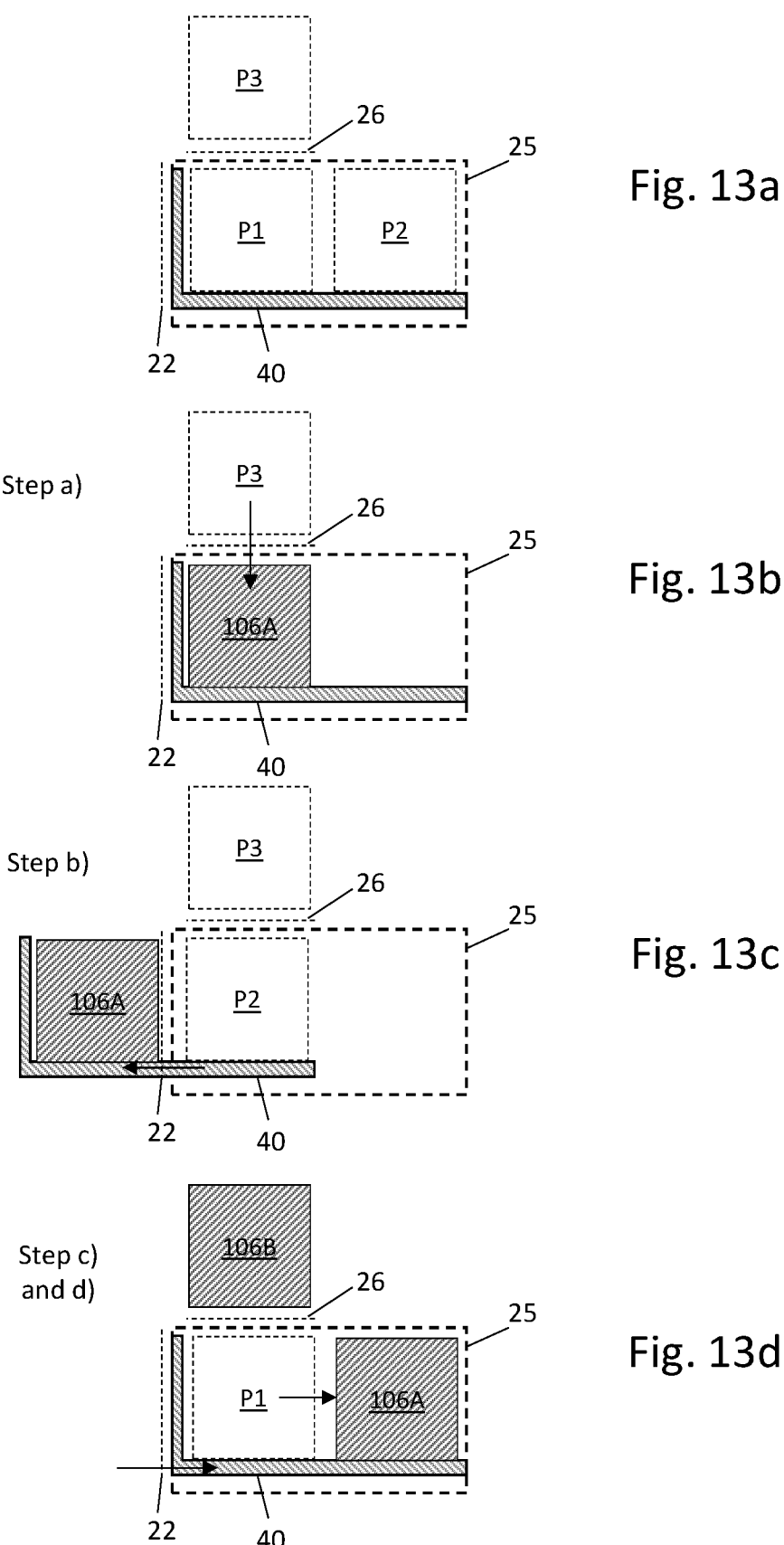
FIG. 13a-h illustrates the steps of operating the embodiment of the access station in detail.
Figures 13E, 13F, 13G, 13H:
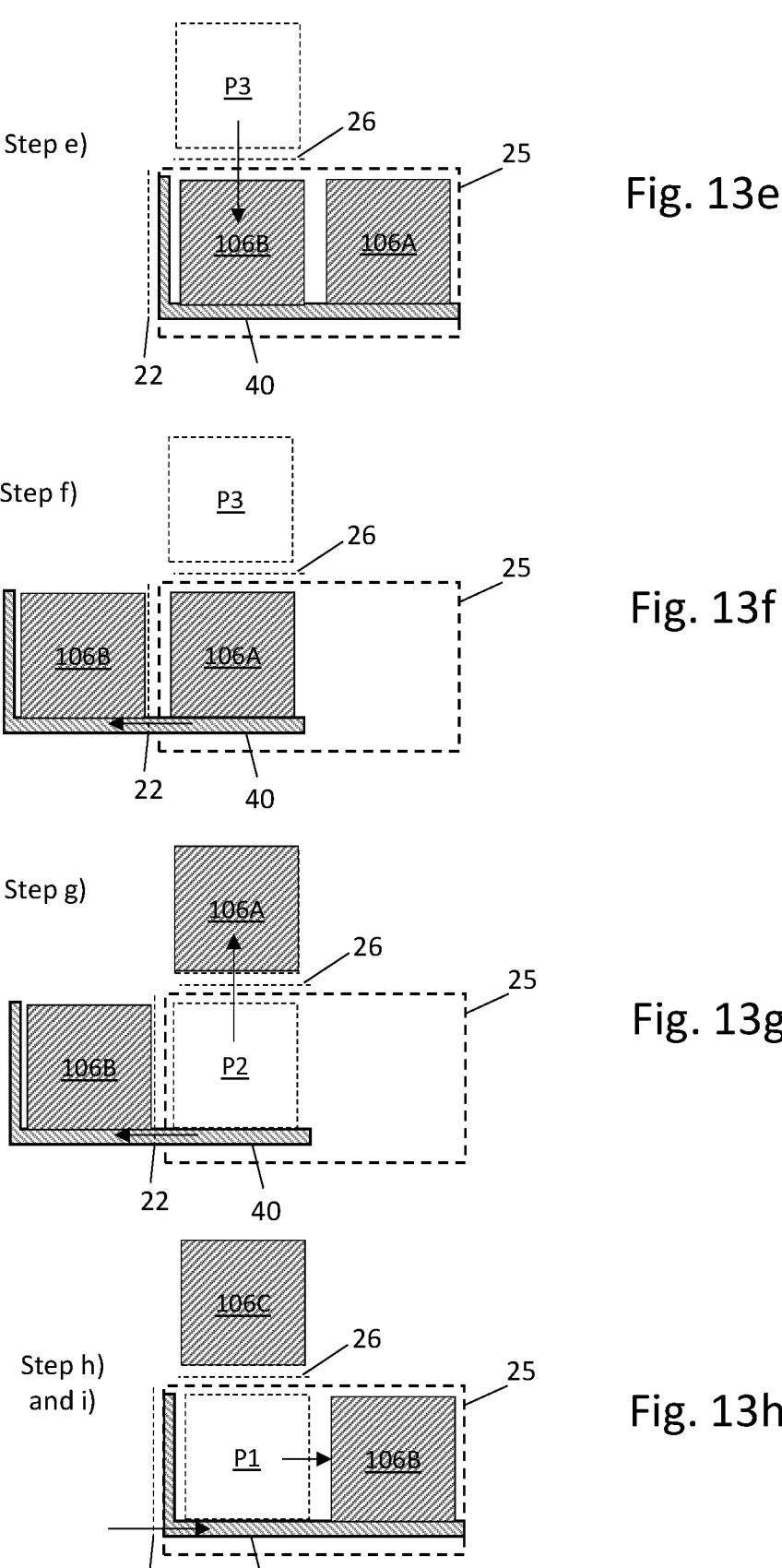

Initially, in FIG. 13a, there are no storage containers 106 in the drawer 40 and there is no storage container 106 in the buffer position P3 in the first storage column 105A. The drawer 40 is in the retracted position RP.

In a first step a) (FIG. 13b) the access station 10 receives a first storage container 106A. A container handling vehicle 201, 301 is controlled to pick a first storage container 106A from one of the storage columns 105 in the framework structure 100 and to lower it down into the front position P1 of the drawer 40. On its way down the storage column 105A, the first storage container 106A will pass the buffer position P3.

In a second step b) (FIG. 13c), the first actuator 62 is controlled to move the drawer 40 to the presentation position PP. Here, the first storage container 106A is presented to the picker P.

In a third step c) (FIG. 13d), the first actuator 62 is controlled to move the drawer 40 to the retracted position RP within the access module 20. In a next step d), the second actuator 64 is controlled to move the first storage container 106A from the front position P1 to the rear position P2 of the drawer 40. It should be noted that step c) may be performed before step d). Alternatively, step c) and d) may be performed simultaneously or substantially simultaneously. The safety mechanism will stop the movement of the drawer 40 if a finger/hand is located within the storage container on its way into the compartment 25 and will also stop the movement of the drawer 40 if a finger/hand is located between the front plate and the storage container on its way into the compartment 25.

After step c) and d), the drawer 40 is in the retracted position RP and the first storage container 106A is in the rear position P2. The actuator element 64b will now return to its original position close to the front 42 of the drawer 40.

During or after step c) and d), the container handling vehicle 201, 301 may be controlled to pick a second storage container 106B from one of the storage columns 105 in the framework structure 100 and to lower it down to the buffer position P3.

In a next step e) (FIG. 13e), the access station 10 receives the second storage container 106B from the buffer position P3. The second storage container 106B is lowered down into the front position P1 of the drawer 40. It should be noted that the container handling vehicle 201, 301 may hold the second storage container 106B stationary in the buffer position P3 while waiting for steps c) and d). However, the container handling vehicle 201, 301 may also be coordinated with the access station 10 so that there is no waiting time for the second storage container 106B in the buffer position P3.

In a next step f) (FIG. 13f), the first actuator 62 is controlled to move the drawer 40 to the presentation position PP in which the second storage container 106B is presented to the picker P.

During or after step f), the first storage container 106A is retrieved from the rear position P2 by means of a container handling vehicle 201, 301.

In a next step g) (FIG. 13h), the first actuator 62 is controlled to move the drawer 40 to the retracted position RP within the access module 20. In a next step h), the second actuator 64 is controlled to move the second storage container 106B from the front position P1 to the rear position P2 of the drawer 40. Hence, steps g) and h) are similar to the above steps c) and d).

The actuator element 64b will now return to its original position close to the front 42 of the drawer 40.

During or after step f) and h), the container handling vehicle 201, 301 may be controlled to pick a third storage container 106C from one of the storage columns 105 in the framework structure 100 and to lower it down to the buffer position P3.

The above steps are then repeated.

Alternative Embodiment

Figure 14:
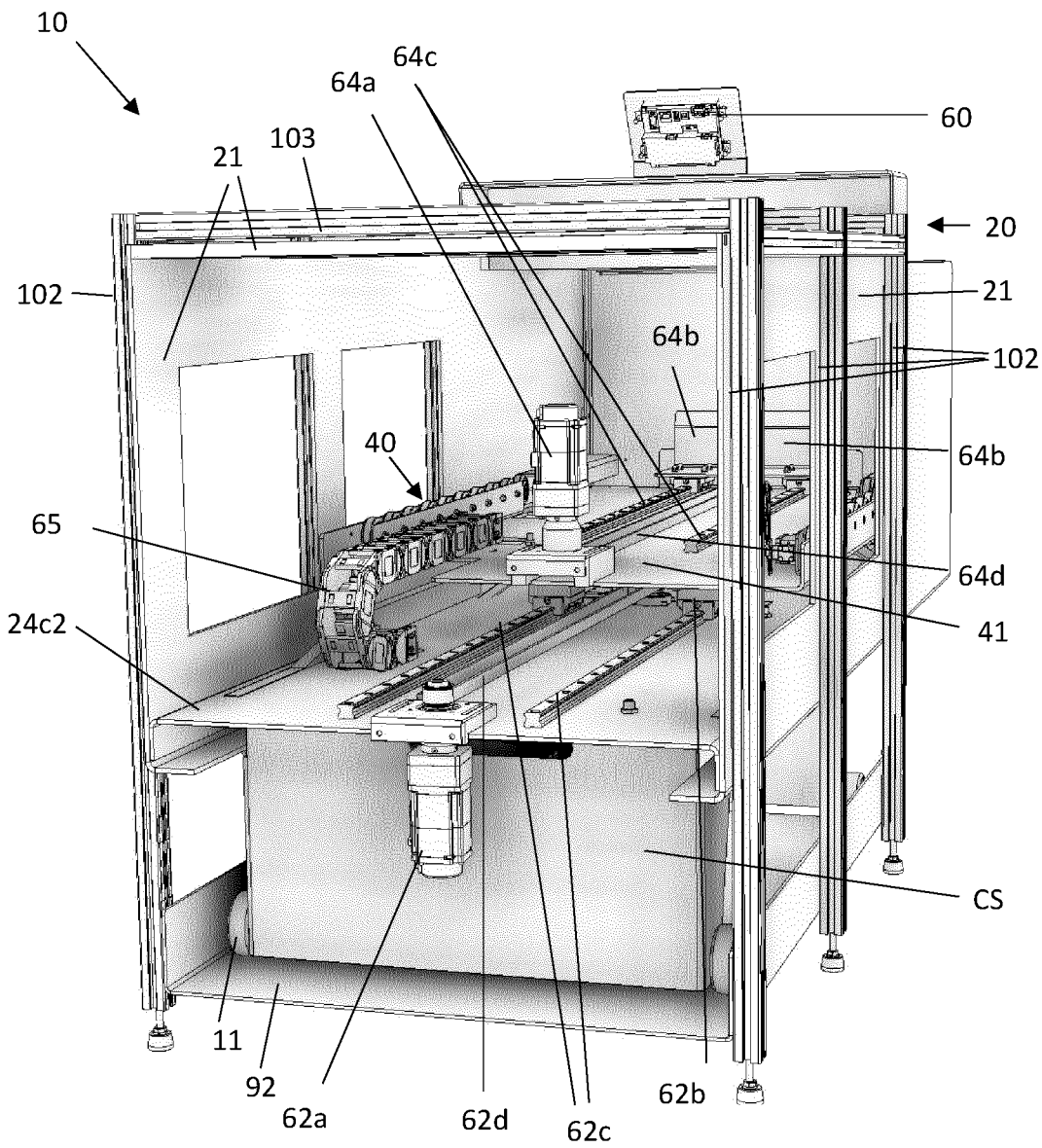
FIG. 14 illustrates a rear perspective view of a further embodiment of the access station and parts of the framework structure.
Figure 15:
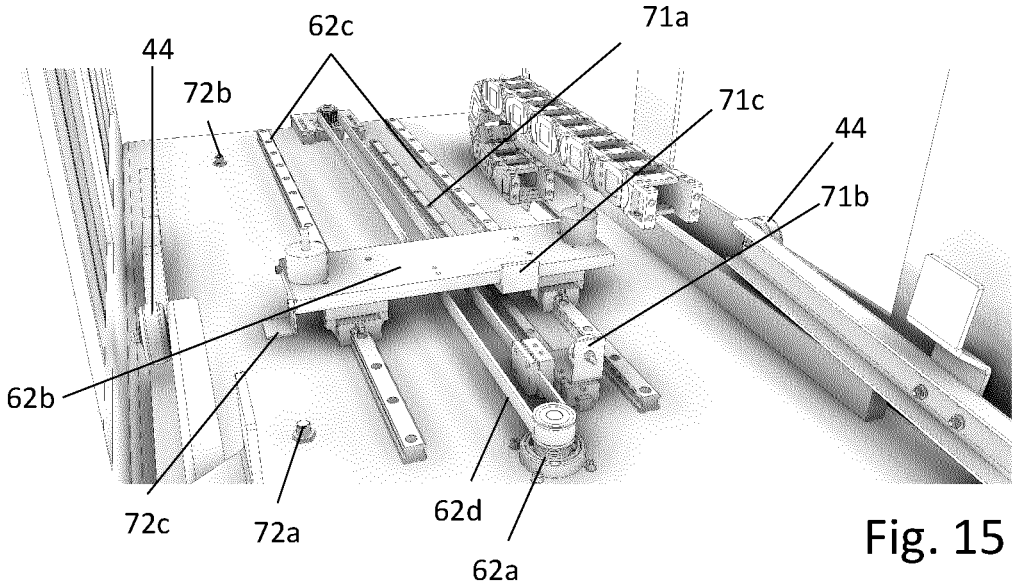
FIG. 15 illustrates an enlarged perspective view of an alternative embodiment of the first actuator (the drawer base is removed from the drawing).
Figure 16:
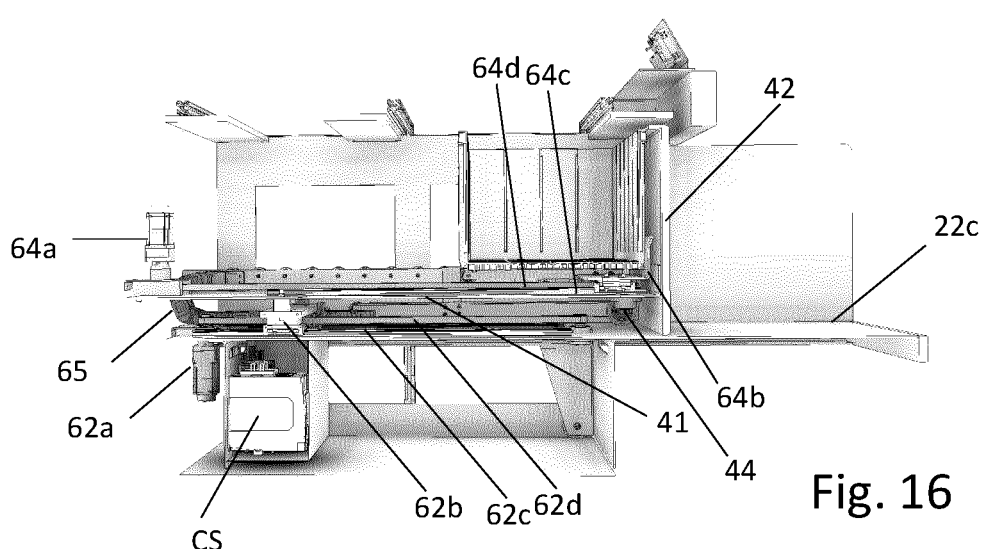
FIG. 16 illustrates a side view of the embodiment of FIGS. 14 and 15.

It is now referred to FIGS. 14-16. Most of the technical features of the access station 10 and the operation of the access station 10 is identical to or similar to the embodiment described above. Only differences between the embodiment described above and this alternative embodiment will be described below.

First, it should be noted that the first actuator 62 and the second actuator 64 works substantially in the same way as in the above embodiment.

The first actuator 62 comprises an electric rotating motor 62a for driving a belt 64d, to which the actuator element 62b is connected. The actuator element 62b is further connected to the drawer 40 and the drawer 40 is moved by means of the electric rotating motor 62a via the belt 62d and the actuator element 62b. The movement of the actuator element 62b is guided along rails 62c engaged with the actuator element 62b.

It is now referred to FIG. 15. Here it is shown that the access station 10 comprises a presentation position sensor 72a and a retracted position sensor 72b. It is also shown that the actuator element 62b comprises a sensor engaging part 72c, here in the form of a bracket protruding to a position in which the sensor engaging part 72c is brought adjacent to, or in contact with, the presentation position sensor 72a when the drawer 40 is in the presentation position PP and adjacent to, or in contact with, the retracted position sensor 72b when the drawer 40 is in the retracted position. The sensors 72a, 72b may be optical sensors, capacitive sensors, a contact-type of sensor etc. The sensors 72a, 72b are connected to the control system CS.

In FIG. 14 and FIG. 15 it is further shown an energy chain 65 for guiding and protecting electrical conductors and signal conductors between the control system CS and the weight sensor and electric motor of the drawer.

In FIG. 15, it is shown that the access station 10 comprises a further safety system comprising a rail 71a for guiding a linear movement of a first magnet element 71b. The first magnet element 71b is connected to, and driven by, the belt 62d of the second actuator 62. A second magnet element 71c is connected to the actuating element 62b of the second actuator 62. The first and the second magnet elements 71b, 71c are magnetically connectable to each other.

It is now assumed that the drawer 40 (and hence the actuator element 62b) are in the retracted position. The belt 62d, including the first magnet element 71b is now moved by means of the motor 62a. Due to the magnetic coupling between the first and second magnet elements 71b, 71c, the first magnet element 71b will pull the actuating element 62b towards the presentation position PP as the belt moves. If the drawer 40 is held back, for example by an object obstructing the movement of the drawer from the retracted position RP to the presentation position PP, the first and the second magnet elements 71b, 71c will be pulled away from each other, causing the drawer 40, the actuating element 62b and hence the second magnet element 71c to stop while allowing the first magnet element 71b and the belt 62d to continue its linear movement. During movement of the first magnet element 71b and the belt 62d back to their initial position, the first magnet element 71b will reconnect to the second magnet element 71c again.

The second actuator 64 comprises a rotating electric motor 62a for driving a belt 64d to which the actuator element 64b is connected. The actuator element 64b is moved by means of the electric rotating motor 64a via the belt 64d. The movement of the actuator element 64b is guided along rails 64c engaged with the actuator element 64b.

Figure 17:
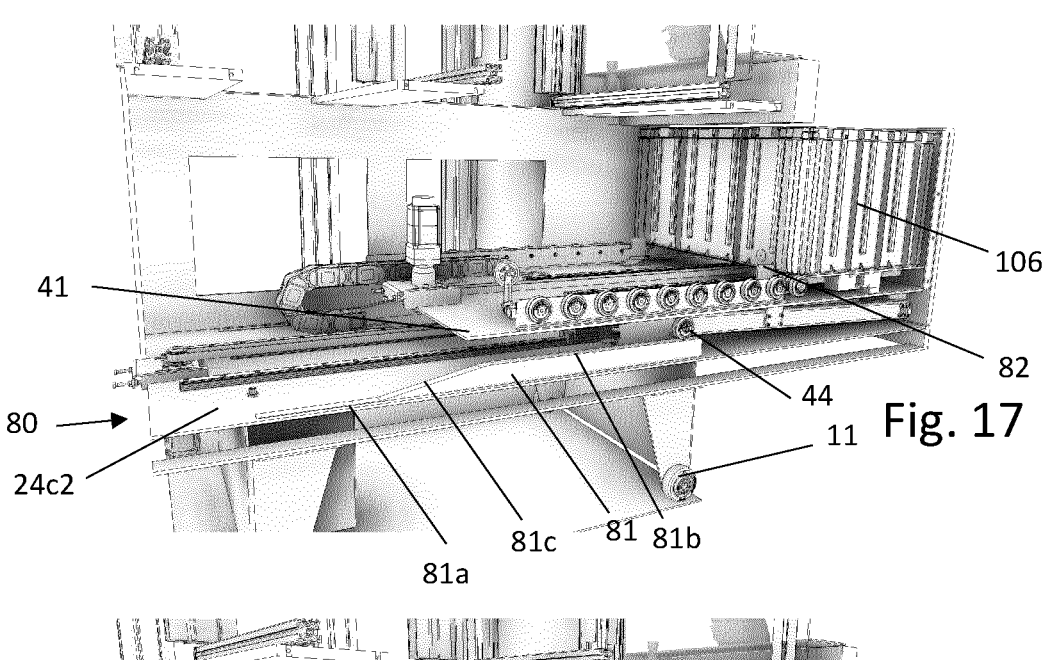
FIG. 17-19 illustrates details of a container stop.
Figure 18:
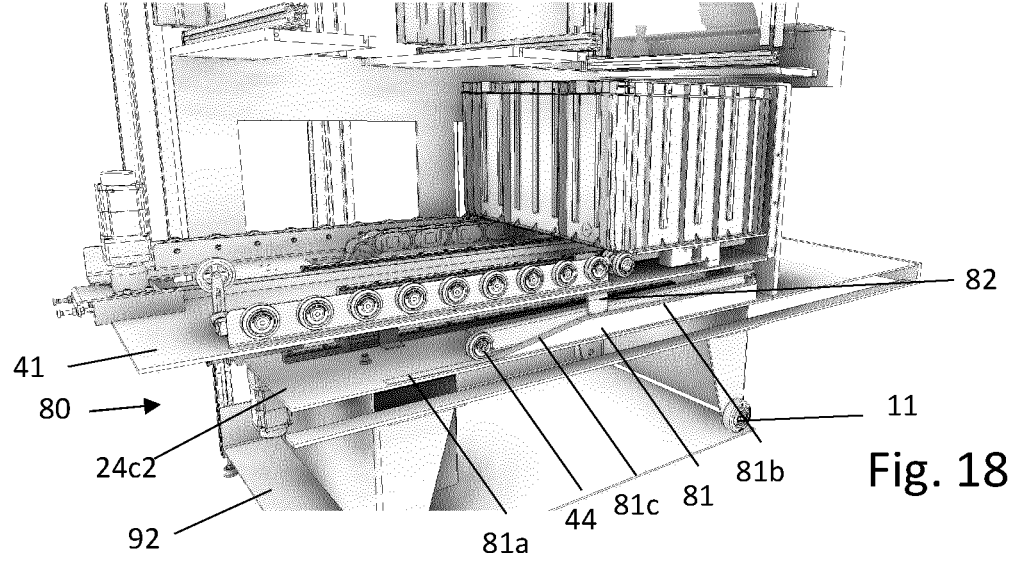
Figure 19:
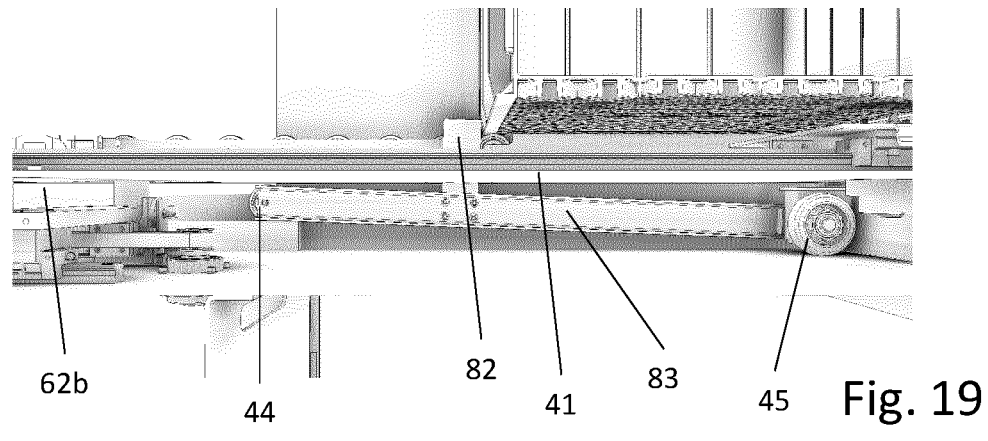

It is now referred to FIGS. 17-19. Here, details of a container stop 80 is illustrated. Initially, it should be mentioned that the drawer base 41 is supported on the plate 24c via the actuating element 62b of the second actuator 62 and by wheels 44, 45 connected to each other by means of a wheel connector member 83.

The container stop 80 comprises a profile 81 secured to the plate 24c2, the profile having a lowered profile section 81a, an elevated profile section 81b and an intermediate, inclining, profile section 81c between the profile sections 81a, 81b.

The container stop 80 further comprises a container stop element 82 secured to the wheel connector member 83.

The rear wheels 44 are running on top of the profile 81. In FIG. 17 the drawer is in the presentation position (PP). Here, the rear wheels 44 are located on the elevated profile section 81b, causing the rear part of the wheel connector member 83 to tilt upwardly, and hence causing the container stop element 82 to protrude up on the rear side of the storage container 106 in the front position P1. Movement of the storage container 106 from the front position to the rear position (for example by a person trying to push the storage container) is now prevented. It is also possible for the container stop element 82 to prevent the storage container 106 to be lifted up from the drawer in the presentation position (to prevent theft etc).

In FIG. 16, the drawer is in the retracted position (RP). Here, the rear wheels 44 are located on the lowered profile section 81a, causing the rear part of the wheel connector member 83 to tilt downwardly, and hence causing the container stop element 82 to retract down from the rear side of the storage container 106 in the front position P1.

Movement of the storage container 106 from the front position to the rear position by means of the second actuator 64 is now allowed.

It should be noted that in the first embodiment of the access station 10 described above, the access module 20 is integrated with the framework structure, due to the frame 21 comprising lintels 102a for supporting the upright members 102 from below. Hence, service, maintenance and repair operations of the access station may be cumbersome.

In the second embodiment shown in FIG. 17-20, the frame 21 is not supporting the upright members 102 from below. Instead, the access module 20 is an independent access module with a self-supporting frame 21 provided with wheels 11.

Here, the framework structure 100 comprises an access station compartment 90 having a side opening 81 which can be covered by a panel (PA) when not in use. The access station 10 is then insertable into and retrievable from the access station compartment 90.

Figure 20:
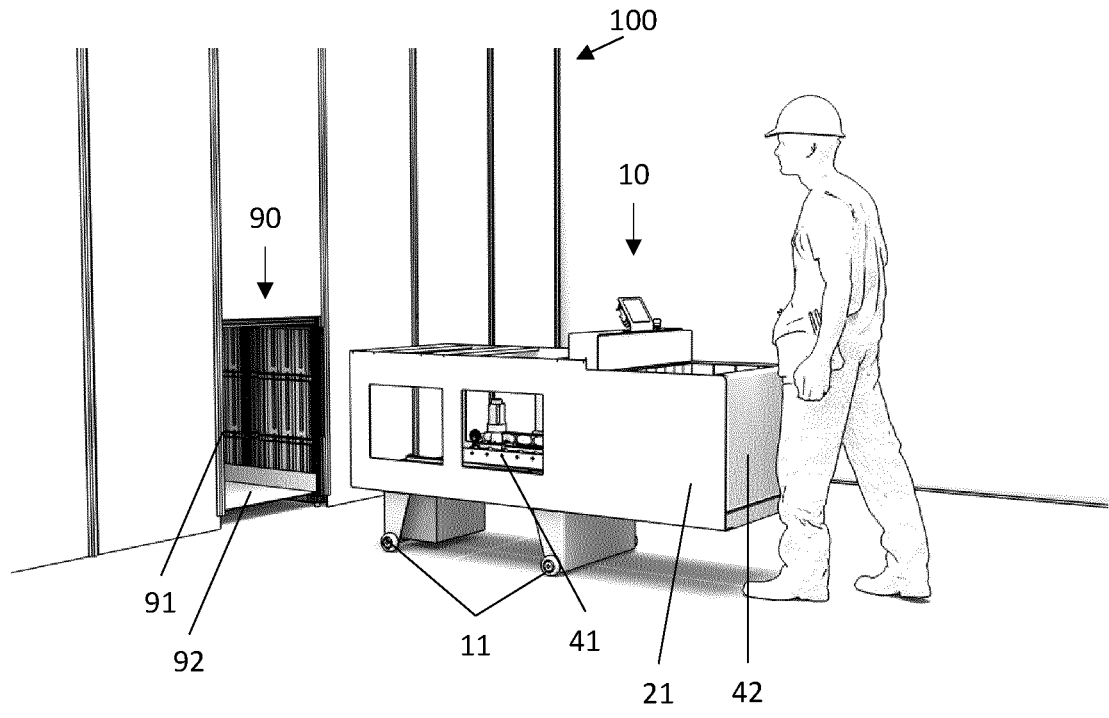
FIG. 20 illustrates how an access station can be inserted into and retrieved from an access station compartment.

In FIGS. 14 and 20, it is shown that the frame 21 is located inside upright members 102 and horizontal members 103. It is also shown that a support plate 92 is secured below the lower ends of the upright members. The wheels 11 of the access station 10 are supported onto this support plate 92 when inserted into the access station compartment 90.

Other Alternative Embodiments

In the above description, the vertical movement of the storage containers through the top opening 26 is performed by container handling vehicles 201, 301. Alternatively, a type of container lift may be used to move the storage containers vertically to and from the access station 10.

In the above embodiment, the access station 10 occupies one storage column 105A for vertical transportation of storage containers, and two other storage columns 105B, 105C has reduced storage capacity due to the footprint areas A20, A40.

By reducing the first and second distances DA, DB, it is possible to achieve full storage capacity in the third storage column 105C. This may require a different and/or more space-efficient safety mechanism. One such possible safety mechanism is a movement detection type of sensor, for example a photoelectric sensor for sensing whether or not a finger/hand is present in the area close to the access opening 46 and or the front opening 22 during movement of the drawer 40 towards the retracted position RP.

In the preceding description, various aspects of the access station and the automated storage and retrieval system according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

LIST OF REFERENCE NUMBERS (1) retrieval system
(20) access module
(21) frame
(22) dashed rectangle
(22) front opening
(22b) side guiding plates
(22c) lower guiding plate
(22d) guard
(24a) two side plates
(24b) cross members
(24c1) upper horizontal cross plate
(24c2) lower cross plate
(24d) horizontal cross plate
(25) drawer compartment
(26) top opening
(40) drawer
(41) drawer base
(42) drawer front
(44) rear wheels of drawer base
(45) front wheels of drawer base
(46) access opening
(50) support
(54) wheels
(56) weight sensor
(60) user interface system
(62) first actuator
(62a) electric motor
(62b) actuator element
(62c) guide/rail
(64) second actuator
(64a) electric motor
(64b) actuator element
(64c) guide/rail
(66) safety mechanism
(66a) flap element
(66b) sensor
(66c) flap holding structure
(66d) hinges
(71a) rail
(71b) first magnet element
(71c) second magnet element
(80) container stop
(81) profile
(81a) lowered profile section
(81b) elevated profile section
(81c) intermediate, inclining, profile section
(82) container stop element
(83) wheel connector member
(90) access station compartment
(91) opening to access station compartment
(92) support plate
(100) framework structure
(102) upright members
(102a) lintels
(103) horizontal members
(105, 105A, 105B, 105C) storage columns
(106, 106A, 106B, 106C) storage containers
(107) stacks
(108) upper rail system
(201) container handling vehicle
(301) container handling vehicle
(500) control system
(CS) control system
(DA) first distance
(DB) second distance
(FS) front side
(RS) rear side
(PA) panels
(PP) presentation position
(PP) retracted position
(RP) retracted position (A105B) area
(A20) footprint area
(A40) footprint areas
(D20) depth
(H20) height
(P1) front position
(P2) rear position
(P22) vertical plane
(P3) buffer position
(W20) width

The invention claimed is:

1. An access station for presentation of a storage container from an automated storage and retrieval system to a picker, wherein the access station comprises:
   an access module comprising a frame defining a drawer compartment provided within the frame;
   a drawer comprising a drawer base and a drawer front, wherein the drawer is movably connected to the frame; and
   a first actuator for moving the drawer relative to the frame between a presentation position in which the drawer is protruding from the drawer compartment and a retracted position in which the drawer is retracted within the drawer compartment;
   wherein the drawer base comprises a support on which the storage container can be supported in a front position or in a rear position;
   wherein the access station comprises a second actuator for moving the storage container from the front position to the rear position;
   wherein the storage container is presented to the picker when the storage container is in the front position and when the drawer is in the presentation position; and
   wherein the support comprises a weight sensor for measuring a weight of the storage container when supporting the storage container in the front position.

2. The access station according to claim 1, wherein the access station comprises a front opening, wherein a portion of the drawer is configured to protrude from a front side of the front opening when the drawer is in the presentation position.

3. The access station according to claim 2, wherein the frame comprises a guard defining an upper border of the front opening.

4. The access station according to claim 3, wherein the access station comprises a safety mechanism for preventing an object from being squeezed between the drawer front and the guard during movement of the drawer from the presentation position to the retracted position.

5. The access station according to claim 4, wherein the safety mechanism comprises:
   a flap element provided adjacent to, and on the front side of, the guard;
   a sensor for sensing movement of the flap element relative to the guard.

6. The access station according to claim 5, wherein the flap element is movably connected to a flap holding structure secured to the frame.

7. The access station according to claim 6, wherein the flap holding structure is a supporting structure for a user interface system.

8. The access station according to claim 2, wherein the frame comprises a guard defining an upper border of the front opening, and wherein the drawer front and the guard are vertically aligned when the drawer is in the retracted position.

9. The access station according to claim 1, wherein the access station comprises a top opening through which a storage container is retrievable from the drawer and through which a storage container is receivable by the drawer.

10. The access station according to claim 9, wherein the front position is located below the top opening when the drawer is in the retracted position and wherein the rear position is located below the top opening when the drawer is in the presentation position.

11. The access station according to claim 1, wherein the access station is configured to:
   receive a storage container in the front position when the drawer is in the retracted position; and
   allow a storage container to be retrieved from the rear position when the drawer is in the presentation position.

12. The access station according to claim 1, wherein the access station is configured to:
   move a storage container from the front position to the rear position when the drawer is in the retracted position or while the drawer is moving from the presentation position to the retracted position.

13. The access station according to claim 1, wherein the frame comprises vertical side guiding plates for guiding the drawer front as the drawer extends out to the presentation position and as the drawer retracts to the retracted position.

14. The access station according to claim 1, wherein the support comprises rollers for supporting the storage container in the rear position.

15. The access station according to claim 1, wherein the second actuator comprises an electric motor and an actuating element movable by means of the electric motor.

16. The access station according to claim 1, wherein the drawer comprises a container stop for preventing movement of the storage container from the front position towards the rear position when the drawer is in the presentation position.

17. An automated storage and retrieval system comprising a framework structure, wherein the framework structure comprises:
   upright members;
   horizontal members;
   a storage volume comprising storage columns provided between the members, wherein storage containers are stackable in stacks within the storage columns; and
   a rail system provided on top of the members;
   wherein the automated storage and retrieval system comprises container handling vehicles moving on the rail system;
   wherein the automated storage and retrieval system comprises an access station for presentation of a storage container from the automated storage and retrieval system to a picker, wherein the access station comprises:
   an access module comprising a frame defining a drawer compartment provided within the frame;
   a drawer comprising a drawer base and a drawer front, wherein the drawer is movably connected to the frame; and
   a first actuator for moving the drawer relative to the frame between a presentation position in which the drawer is protruding from the drawer compartment and a retracted position in which the drawer is retracted within the drawer compartment;
   wherein the drawer base comprises a support on which the storage container can be supported in a front position or in a rear position;

wherein the access station comprises a second actuator for moving the storage container from the front position to the rear position;

wherein the storage container is presented to the picker when the storage container is in the front position and when the drawer is in the presentation position;

wherein the drawer compartment is provided within the framework structure and wherein the drawer is at least partially protruding from the framework structure in the presentation position; and wherein the support comprises a weight sensor for measuring a weight of the storage container when supporting the storage container in the front position.

18. The automated storage and retrieval system according to claim 17, wherein the frame comprises lintels for supporting upright members of the framework structure.

19. The automated storage and retrieval system according to claim 17, wherein the container handling vehicles are able to:

retrieve the storage container from the drawer via one storage column; and deliver a further storage container to the drawer via the one storage column.

* * * * *